United States Patent [19]
Dodge et al.

[11] 3,787,867
[45] Jan. 22, 1974

[54] NAVIGATIONAL AID SYSTEM
[75] Inventors: Robert J. Dodge; Wilson R. Huffer, both of Houston, Tex.
[73] Assignee: Automatic Power Division, Pennwalt Corporation, Houston, Tex.
[22] Filed: Apr. 12, 1971
[21] Appl. No.: 133,190

[52] U.S. Cl.................. 343/225, 340/29, 325/58, 73/178 R
[51] Int. Cl............................................. G08g 3/00
[58] Field of Search............343/225, 228; 116/107; 325/58, 322; 340/163, 147 R, 29; 73/178 R

[56] References Cited
UNITED STATES PATENTS

| 2,869,121 | 1/1959 | Minneman et al. | 343/101 X |
| 3,128,465 | 4/1964 | Brilliant | 343/225 |
| 2,297,618 | 9/1942 | Grimes | 325/392 X |
| 3,044,065 | 7/1962 | Barney et al. | 343/225 X |
| 2,671,897 | 3/1954 | Woodbury | 343/101 |
| 2,606,282 | 8/1952 | Lipkin | 343/101 |
| 3,440,657 | 4/1969 | Cataldo | 343/225 |
| 2,797,367 | 6/1957 | Scott et al. | 340/82 X |

Primary Examiner—John W. Caldwell
Assistant Examiner—William M. Wannisky
Attorney, Agent, or Firm—Hyer, Eickenroht, Thompson & Turner

[57] ABSTRACT

A navigational aid system is disclosed in which the operation of a plurality of navigational aid devices is synchronized by a distinctive radiated energy signal received by each of the devices so that the navigational signals emitted by the devices occur either simultaneously or in a predetermined sequence. The distinctive radiated energy signal may be provided by a radio beacon or a signal generated from a transmitter in one of the navigational devices of the system.

16 Claims, 6 Drawing Figures

ROBERT J. DODGE
WILSON R. HUFFER
INVENTORS

BY Hyer, Eickenroht,
Thompson & Turner
ATTORNEYS

NAVIGATIONAL AID SYSTEM

This invention relates to navigational aids and in one of its aspects to a navigational aid system wherein the generation of a plurality of distinct navigational aid signals can be synchronized in response to a distinctive radiated energy signal.

Navigational aids, such as fog horns and flashing lights, are mounted on hazards or platforms found in navigable waters in order to alert passing ships of the presence of such hazards or platforms. Flashing lights also are generally mounted on buoys and arranged to mark the boundaries of a navigable channel in order to guide ships along the channel or through an area heavily congested with traffic, such as a habor. Unfortunately, in a congested area, flashing lights may be used in such abundance for uses other than marking a navigable channel that it may be very difficult for a pilot to determine which of the flashing lights in the vicinity mark the channel he is to follow as distinguished from a background of other flashing lights.

In order to overcome this difficulty, all the flashing lights mounted on a particular hazard or group of hazards, or marking a particular navigable channel can be synchronized to flash simultaneously so that a passing ship can discern the simultaneously flashing lights from a background of randomly flashing lights. However, the use of a plurality of synchronized navigational aids is presently limited to situations where the aids are mounted sufficiently close to each other and at localities where they can be connected by electrical wire. It is generally impractical to do this in the open sea or in navigable waters. Also, even where the lights or other navigational aids are located so that they can be practically connected by electrical wire, it may be desirable to provide for synchronizing the operation of the aids from some external location, such as a ship or airplane.

One suggested system for operating navigational aid lights simultaneously provided that the electrical circuitry for each flashing light include a control oscillator having extremely good long term stability in the order of 0.000002 percent accuracy. The oscillators at each light source would operate in synchronism with the other similar oscillators in the system so that all the lights would flash simultaneously. It was proposed that these oscillators would ideally provide simultaneously flashing lights for periods as long as 3 three months, and then the oscillators could be manually reset at the end of this period. However, such a system requires an extremely stable oscillator for each navigational aid device having a flashing light, and such oscillators are impractical and difficult to provide for the short flash periods and service involved and are relatively expensive. In addition, the periodic manual resetting of the oscillator for each flashing light, for example, at the end of every 3 months, may require a large amount of time and manpower, especially where the flashing lights are mounted on offshore hazards or arranged in rows for channel lights.

It is thus an object of this invention to provide a navigational aid system including a plurality of navigational aid devices in which the operation of the devices can be synchronized without the need of electrical connections between them, and without the need for extremely stable oscillators of the type contemplated in the prior art.

Another object of this invention is to provide such a navigational aid system which may be operated unattended for relatively long periods of time.

It is another object of this invention to provide such a system in which the operation of each of the navigational aids in the system is synchronized in response to receipt of a distinctive radiated energy signal.

Radio beacons which send periodic coded identification and marking signals are transmitted under control of governmental agencies from different locations along most of the navigable waters of the United States. These radio beacons are transmitted on the same frequency and the coded identification signals appear at constant time intervals on the beacon. It is thus another object of this invention to provide such a navigational aid system in which the distinctive radiated energy signal for synchronizing the operation of a plurality of navigational aid devices in the system is a radio beacon.

At other times such a radio beacon may not be available for synchronizing purposes and it is another object of this invention to provide such a navigational aid system in which the distinctive radiated energy signal may be emitted by a transmitter mounted in one of the navigational aid devices of the system.

In a crowded shipping channel, simultaneously operating a plurality of flashing lights may not be sufficient to permit these lights to be distinguished from surrounding lights, and it is a further object of this invention to provide a navigational aid system in which a plurality of navigational aid signals are emitted sequentially.

Another object of this invention is to provide a navigational aid device for use in a navigational aid system which accomplishes one or more of the foregoing objects.

These and other objects, advantages and features of this invention, which will be apparent to those skilled in the art from a consideration of the specification, including the attached drawings and appended claims, are accomplished in one embodiment of this invention by providing a receiver at each of the navigational aid devices in a system, for example, at each of a plurality of flashing lights marking a navigational channel. Each such receiver receives some radiated energy signal which sends a periodic distinctive code. Each navigational aid device also includes means which decode the coded received signal and provides a synchronizing signal in response to receipt of each periodic distinctive code. These synchronizing signals, which are generated simultaneously in each navigational aid device, are used to reset the timing circuits which control the periodic operation of each flashing light. If desired, when the devices are located in a row, such as along the boundary of a navigation channel, delay circuits each having a progressively longer delay can be connected between the means providing the synchronizing signal and the lamp control circuits of each respective flashing light device. In this manner, the lights along the channel can be caused to flash sequentially to further aid in distinguishing the navigational channel.

In another embodiment of this device, a transmitter is provided in one of the plurality of navigational aid devices in a system of such devices, each of the remaining devices in the system including a receiver and synchronizing circuit. The one device including the transmitter is thus a master device and each time its light flashes, a distinctive signal is transmitted from this master device and received by the remaining or slave devices which then operate in unison in response to the received distinctive signal.

The invention will now be described in detail in connection with the attached drawings in which:

FIG. 6 is a block diagram of the circuitry of a navigational device including a delay circuit for providing sequential operation of the navigational aid devices in a system.

Figures 1, 2:
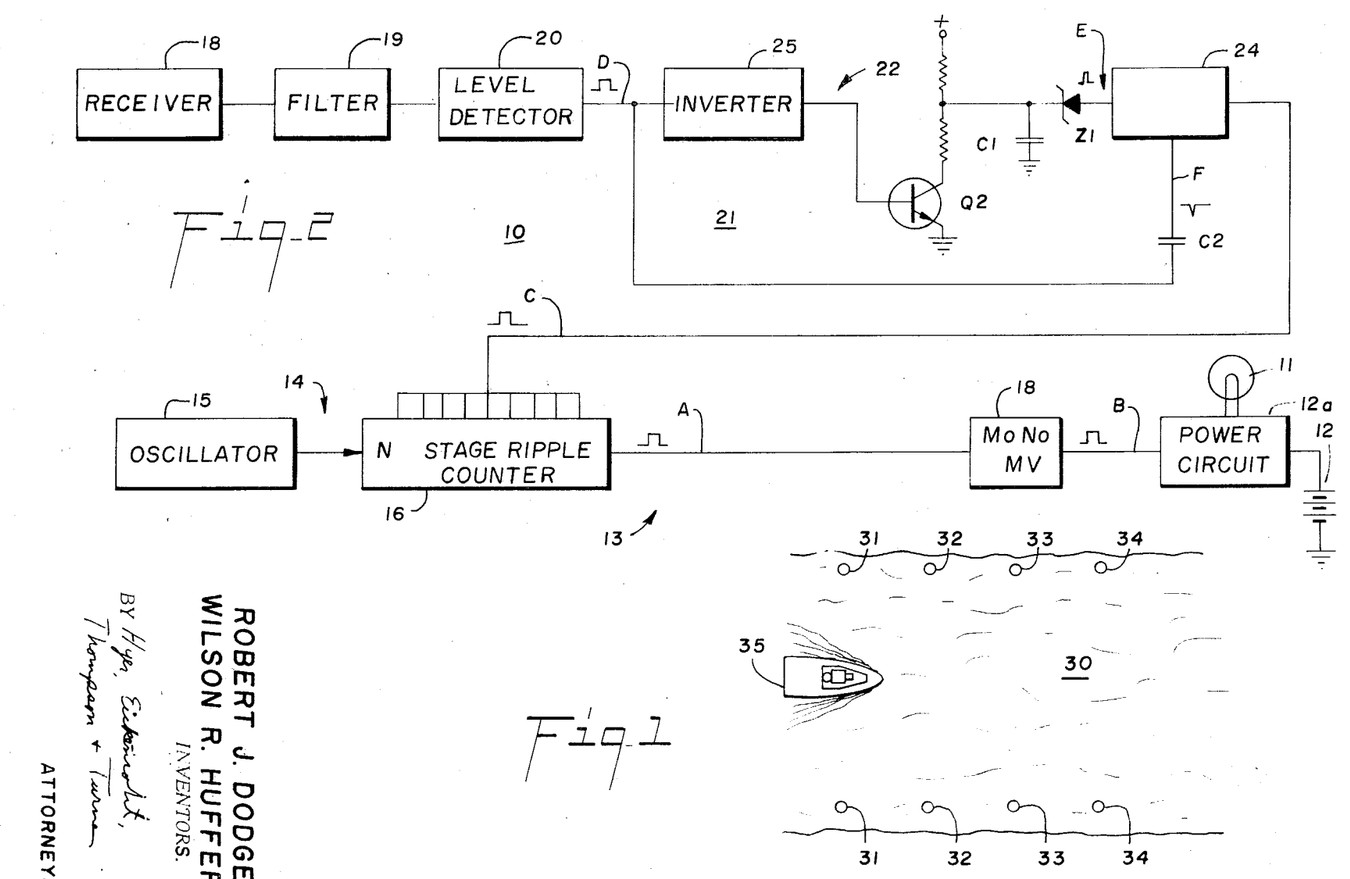
FIG. 1 is a pictorial representation of a ship being guided between two rows of flashing channel lights.
FIG. 2 is a block diagram of the circuitry of one form of a navigational aid device utilizing this invention for generating periodic signals providing an aid to navigation.

In the preferred embodiment of this invention as shown in FIG. 2, a navigational aid device 10 is provided for generating periodic navigational aid signals. In the embodiment shown, the navigational aid device 10 includes a flashing lamp 11 and the usual timing and switching circuits, as hereinafter described, for controlling the operation of the lamp. Such lamps are generally turned on or flashed periodically, for example, once every second and during this second interval, the lamp may be on for about 0.3 of a second and off for about 0.7 of a second. Navigational aid device 10 may be used in conjunction with a number of similar lights forming a system of lights marking a group of hazards or a navigational channel. Of course, navigational aid device 10 may also be a fog horn or any other similar device that provides periodic navigational aid signals in conjunction with a plurality of similar devices. Electrical energy for the operation of device 10 and lamp 11 is provided by a source 12, such as a battery, and is connected to lamp 11 through a suitable power circuit 12a.

An important feature of this invention is that the periodic light signals of a plurality of lamps 11 in a navigational aid system are flashed in synchronism in response to receipt at selected points in time of a distinctive radiated energy signal received at each of the plurality of devices 10 in the navigational aid system. In one form of this invention, the distinctive radiated energy signals are coded signals transmitted by a "radio beacon," which is a radio transmitting station maintained and operated by lighthouse authorities so that ships can determine radio bearings. The radio beacons are located at various points along the coasts of the United States and transmit coded identification and homing signals at regular intervals. A typical radio beacon, which the embodiment of FIG. 2 is particularly designed to receive, provides its coded identification signal followed by a homing and marking signal only 1 minute out of every 6 minutes. For the first 50 seconds of this minite of operation, this typical radio beacon, which may be transmitted at about 300 Khz, provides a series of relatively short duration coded signals (International code dots and dashes) which generally identify the location of the beacon transmitter. During the last 10 seconds of the coded minute, this radio beacon provides a steady 1,000 cycle modulated tone of a relatively long duration. This 10 second tone, or homing signal, occurring once every 6 minutes, may be employed in the present invention as the distinctive radiated energy signal used to synchronize the navigational aid signals emitted by the various devices 10. Of course, other radiated signals and other periodic code sequences may be used with the present invention; however, the radio beacons described offer a very reliable 10 second signal that is available throughout the coastal area of the United States. Also, the generation of a distinctive code at regular short intervals when used by the present invention as a synchronizing time base insures that a plurality of navigational aid devices 10 will be synchronized at relatively short and regular intervals, and avoids the need of expensive timing circuits.

Referring again to FIG. 2, a switch means 13 is connected to power circuit 12a and is adapted to periodically connect energy source 12 to lamp 11 to cause it to turn on, for example, for 0.3 of a second. Switch means 13 includes a clock means 14, for generating a series of triggering pulses A at, for example, one each second. Clock means 14 preferably includes an oscillator 15 which, in the embodiment illustrated, generates output pulses at a frequency of 1,024 Hz, and a multistage ripple counter 16 connected to the output of oscillator 15 for dividing the 1,024 Hz output pulse by 1,024 to provide the triggering pulses A at a frequency of 1 Hz. The output of ripple counter 16 is connected to a monostable multivibrator 18 which responds to each pulse A to provide an output of 0.3 of a second duration for turning circuit 12a on to connect energy source 12 to lamp 11. In the preferred embodiment of this invention, multivibrator 18 produces such a turn-on pulse B in response to triggering pulse A. Since triggering pulses A are produced by counter 16 at the rate of 1 Hz, lamp 11 is flashed on for a period of 0.3 seconds and is off for 0.7 seconds out of each second.

When a plurality of devices 10 are used in a system to provide simultaneous flashing light signals, oscillators 15 in each device should be fairly stable with respect to each other. However, if counter 16 in each device 10 is reset at short intervals, such as in response to the 10 second tone occurring on a radio beacon once every 6 minutes, the required stability can be easily provided. For example, two flashing lights can be appear to the human eye to be flashing simultaneously if two lamps are flashed with respect to each other with an accuracy of approximately 0.05 seconds. Thus, if the flashing signals of lamps 11, with a flash length of 0.3 seconds are to appear to be flashing simultaneously to the human eye, the lamps should flash within 0.05 seconds of each other. Using a radio beacon tone once every 6 minutes to reset counter 16 requires that oscillator 15 have a frequency tolerance of about plus or minus 0.01 percent. For this reason, oscillator 15 is preferably a tuning fork oscillator and such oscillators having a frequency tolerance of greater than plus or minus 0.005 percent are available. Also, using a higher frequency for oscillator 15 and dividing it to a lower frequency improves the accuracy of the timing employed.

In order to receive the radio beacon or other radiated energy signals used to provide a synchronizing time base, a receiver means 18 is provided in each device 10 to receive these radio beacon signals. Receiver means 18 is connected to a decoder or filter circuit 19 which demodulates the received radio beacon to provide a series of pulses representing the received 1,000 Hz coded signals. Filter 19 is preferably a narrow band-pass filter with a pass band at about 1,000 Hz and filters out spurious signals while passing the 1,000 Hz coded signals. A level detector 20 is connected to the output of filter circuit 19 and produces an output D only when signals having a predetermined voltage level, such as the demodulated code signals, are received from filter 19. The duration of each pulse D is substantially equal to the corresponding input coded signal so that when the coded signals (dots and dashes) of relatively short duration are received, pulse D is likewise of short duration. However, when the duration of the coded received signal is long, i.e., 10 seconds, then a pulse D having a 10 second duration is provided. Pulse D forms an input pulse to the synchronizing circuit of this invention which is to be described.

A synchronizing circuit 21 is connected between level detector 20 and switch means 13 in each of devices 10, and circuit 21 responds to receipt by receiver means 18 of a distinctive radiated energy signal, which in the preferred embodiment described is the 10 second long, 1,000 Hz tone, to provide a synchronizing signal C at substantially fixed points in time after receipt of the 10 second tone. Synchronizing circuit 21 preferably includes a circuit means 22 providing an output pulse E in response to input pulse D having a minimum duration, for example, at least 8 seconds, so that the pulse E is not generated by pulses D corresponding in duration to the relatively short duration code signals received by receiver means 18. A gating circuit 24 is connected for receipt of pulse E, which is pulse D differentiated by a capacitor C2 connected to the output of level detector 20. Gating circuit 24 generates synchronizing signals C only in response to the coincidence of pulses E and F to insure that synchronizing signal C is generated only when the pulse length of pulse D is at or greater than, for example, 8 seconds. Gate 24 responds to a negative pulse F, which is provided only when pulse D goes negative, so that the arrangement described provides synchronizing signal C only at the end of the 10 second long 1,000 Hz tone transmitted once every 6 minutes by the received radio beacon. Since each of the devices 10 in the navigational system have the circuits above described and receive the same radio beacon, synchronizing signals C will be generated at the same time at each device 10, i.e., when the received 10 second tone stops.

Figure 3:
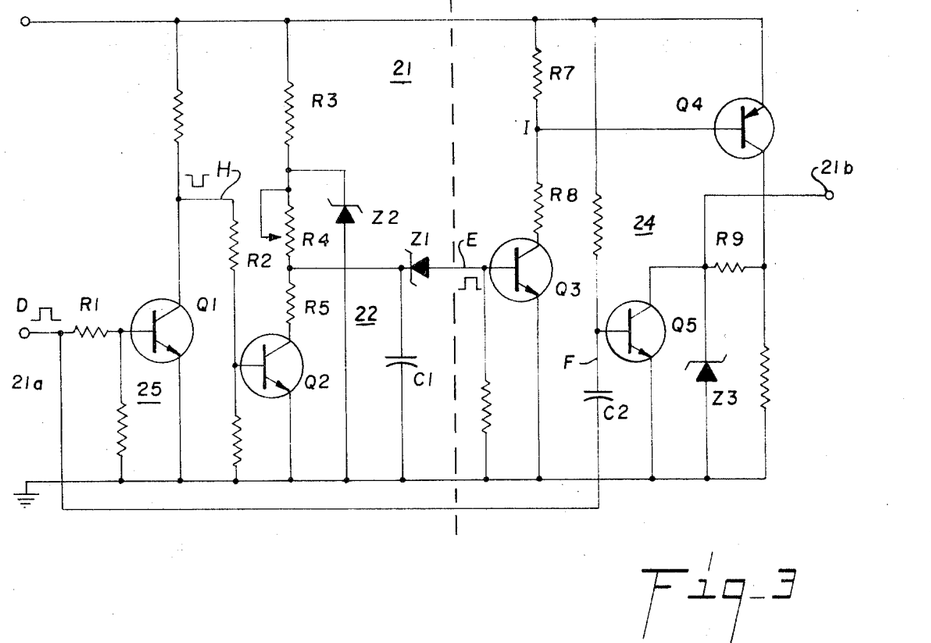
FIG. 3 is a detailed schematic diagram of the circuitry for providing a synchronizing signal at each of the navigational aid devices of this invention in response to receipt of a distinctive radiated energy signal.

In FIG. 3, illustrating the preferred circuitry of synchronizing means 21, circuit means 22 includes a time delay capacitor C1 and circuit means for charging capacitor C1 during the duration of input pulse D. The circuit means for charging capacitor C1 includes an inverter circuit 25 which inverts input pulse D. Inverter circuit 25 includes a transistor Q1 connected at its base through resistor R1 to an input terminal 21a, for receipt of pulse D. A pulse H is provided at the collector of transistor Q1 and this pulse and has a pulse length equal to the pulse length of input pulse D, but is inverted.

The circuit means for charging capacitor C1 further includes transistor Q2, series voltage divider resistors R3 and R4 connected between C1 and a source of charging voltage, and resistor R5 connected between C1 and the collector of transistor Q2. The base of Q2 is connected through a resistor R2 to the collector of Q1 so that the voltage at the base of transistor Q2 is maintained low during the presence of pulses H and D, thus biasing transistor Q2 off each time input pulse D is present at terminal 21a. When this occurs, C1 begins to charge, and the voltage on C1 rises. When pulses H and D are not present, the voltage on capacitor C1 remains at a low level. The R time constant for the charging of capacitor C1 is determined by the value of resistors R3 and R4 and capacitor C1.

Means is also provided which responds to the charge on capacitor C1 reaching a predetermined voltage level to provide pulse E. In the preferred circuit of FIG. 3, this means includes a zener diode Z1 connected between capacitor C1 and the base of transistor Q3. Zener diode Z1 preferably has a breakdown voltage of about 5 volts. Z1 is chosen, in conjunction with the RC circuit of R3, R4 and C1 so that breakdown of the Zener Z1 will occur at a time after receipt of a pulse D sufficient to insure that pulse D corresponds to the long duration 10 second tone on the radio beacon, and, for example, not until capacitor C1 has been charged for about 8 seconds. With the radio beacon being used with the described embodiment as the time base for synchronizing signals C, all the coded identification pulses, which are transmitted by this radio beacon prior to transmission of the 10 second steady tone, have less than 8 seconds duration. Thus, during receipt of these shorter duration coded signals, input pulse D is less than 8 seconds in duration, and with the proper values of R3, R4 and C1, the breakdown voltage of diode 21 will not be reached.

However, if input pulse D has a duration of at least equal to 8 seconds, then the breakdown voltage of 5 volts will be reached and pulse E produced at the base of a transistor Q3 when zener diode D1 breaks down. As long as transistor Q2 remains biased off in response to input pulses D and H, signal E continues to be produced on the base of transistor Q3 and drives Q3 to conduction. A zener diode Z2, rated at 10 volts, for example, is connected between resistors R3 and R4 and ground and regulates the voltage on capacitor C1 to insure accurate repeatability of the timing of the circuit.

As noted, signal E causes transistor Q3 to turn on so that current flows through resistors R7 and R8 connected between B+ and the collector of Q3. The base of transistor Q4 is connected to junction I between R7 and R8. The voltage level at junction I is lowered by the conduction of current through R8 so that transistor Q4 is turned on. When Q4 is turned on, its emitter-collector resistance is lowered such that the voltage on the collector of transistor Q4 increases, and this voltage level remains high during the duration of pulse E.

Input terminal 21a is also connected through coupling capacitor C2 to the base of a transistor Q5, which is connected at its collector through a resistor R9 to the collector of transistor Q4. Capacitor C2 differentiates input pulse D, providing a positive spiked pulse in response to the leading edge of pulse D and a negative spiked pulse in response to the trailing edge of pulse D. The negative spiked pulse is pulse F.

Pulse E also causes transistor Q5 to turn on prior to the end of pulse D, and when this occurs, the voltage at the collector of transistor Q5 remains relatively low. However, the negative going spiked pulse produced by C2 in response to the trailing edge of input pulse D causes the voltage level at the base of Q5 to be lowered whereby Q5 is briefly turned off, causing the voltage at the collector of transistor Q5 and output terminal 21b to rise to provide synchronizing signal C, the level of which is controlled by a zener D3 connected between the collector of Q5 and ground.

The output of synchronizing circuit 21 in each navigational aid device in the navigational aid system is connected to its respective ripple counter 16 so that the synchronizing signals C simultaneously reset each stage of each of counters 16 to the same state. In this manner, triggering pulses A in each device are generated simultaneously and at substantially the same time with respect to the end of the 10 second long radio beacon tone. Thus, the signals emitted by flashing lamps 11 in each device are synchronized with respect to this radio beacon tone and with respect to each other.

The distinctive radiated energy signals that serve as a time base for synchronizing the navigational aid signals emitted by a plurality of navigational aid devices may also be provided by portable transmitters which may be carried on a ship or airplane. In using such a portable transmitter, the pilot, when he approaches an area of known hazards or a navigational channel, can operate a transmitter so that the operation of all the lights identifying the hazard or channel are synchronized in response to a distinctive radiated energy signal from the transmitter. By the term "distinctive radiated energy signal" it is contemplated that any radiated signal such as a radio frequency signal, having a distinctive frequency or sending a distinctive code can be used, as long as the receiving apparatus at each navigational aid device can distinguish it from spurious signals and appropriately respond to it.

Figure 4:
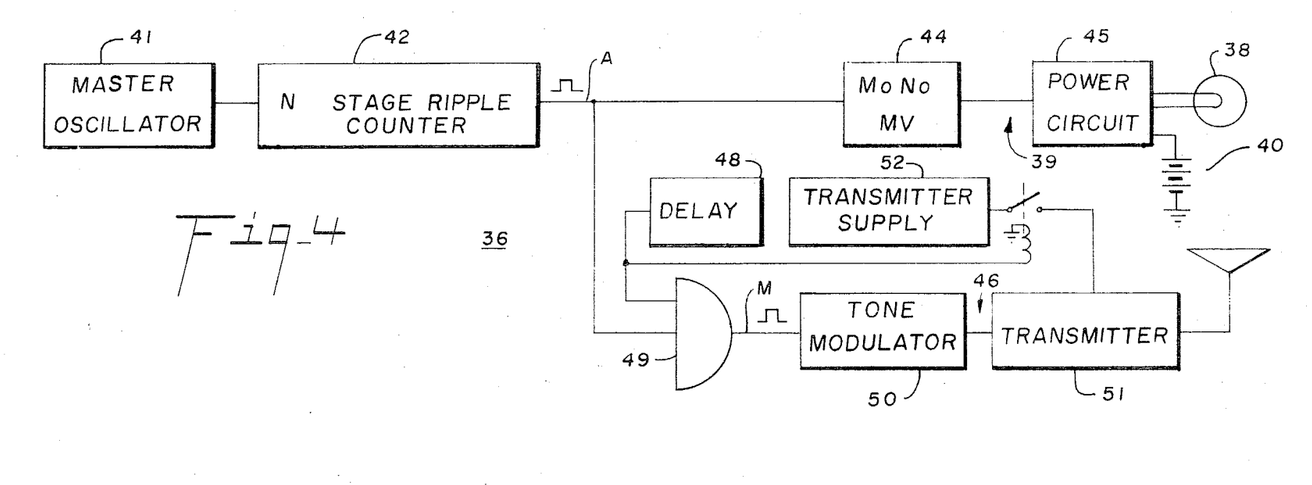
FIG. 4 is a block diagram of the circuitry of another form of navigational aid device of this invention which includes a transmitter for transmitting the distinctive radiated energy signals in order to synchronize the operation of this navigational aid device and a plurality of other such devices.
Figure 5:
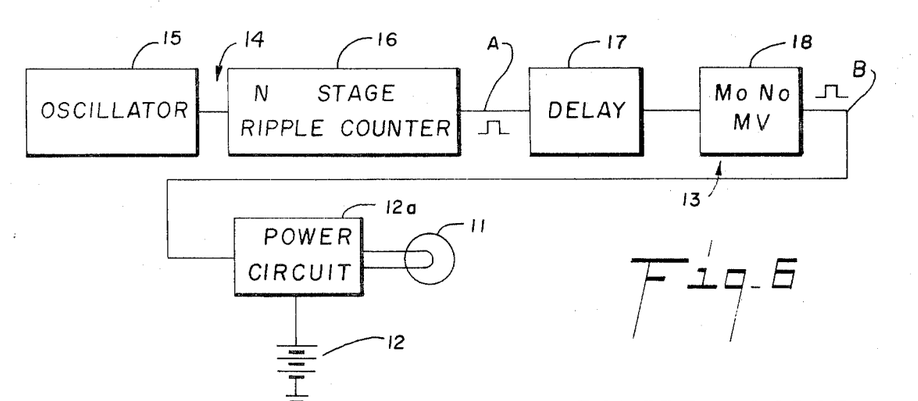
FIG. 5 is a block diagram of the circuitry of the remaining navigational aid devices used in a system with the navigational aid device of FIG. 4.

A transmitter for sending the distinctive signals used as a synchronizing time base may also be included in one of a plurality of navigational aid devices used in conjunction with a particular navigational aid system. In the embodiment of this invention shown in FIG. 4, a master navigational aid device 36 is provided to emit distinctive radiated energy signals which can be received and utilized to synchronize the operation of device 36 with a plurality of navigational aid devices 37 as shown in FIG. 5. Master navigational aid device 36 includes a lamp 38 for emitting periodic signals and a switching circuit 39 connected to lamp 38 and adapted to periodically connect lamp 38 to an electrical energy source 40 through a power circuit 45, as previously described in regard to the embodiment of FIG. 2. Master device 36 also includes a master oscillator 41 which may generate pulses at a frequency of 1,024 Hz, and a ripple counter 42 which divides these pulses to provide triggering pulses A at a frequency of 1 Hz.

A transmitting means 46 is connected to the output of counter 42 and responds to triggering pulse A to provide a transmitted distinctive energy signal. Since the operation of lamp 38 is also controlled by the output of counter 42, the signals emitted by the lamp 38 and those emitted by the transmitting means can be made to occur almost simultaneously. Transmitting means 47 includes a timing control circuit 48 for providing a transmitted synchronizing signal which is periodic but at a lower frequency than pulses A which are at a frequency of 1 Hz, and the transmitted synchronizing signal may occur, for example, once every 5 seconds. Timing circuit 48 also insures that the transmitted synchronizing signal is on for only a short duration sufficient to permit the necessary synchronization each time it is transmitted. For purposes of providing a distinctive radiated signal at the output of transmitter means 46, each time the signal is transmitted it can be modulated by an appropriate tone signal. FIG. 4 illustrates one way in which the desired transmitted signal can be provided. An AND circuit 49 is electrically connected to timing control circuit 48 and to the output of ripple counter 42. AND circuit 49 provides an output signal M each time circuit 48 emits a signal coinciding with pulse A, received from counter 42. Output pulse M is conducted to a tone modulator 50 which modulates the carrier output of a transmitter 51, and this modulated output signal is transmitted to all the navigational aid devices of FIG. 5. When circuit 48 produces its output, it also connects transmitter 51 to an appropriate power source 52. The characteristics of the distinctive radiated energy signal transmitted by the transmitter 51 are determined by the frequency of the modulating tone and the duration of the transmitted signal. For example, this signal may be of 10 second duration, and modulator 50 may modulate the signal at 1,000 Hz during this 10 second period. If this is the case, then a plurality of devices 10, as shown in FIG. 2, may respond to this transmitted signal to provide the synchronized navigational aid signals. However, the distinctive radiated energy signal from transmitter 51 may be a pulse of any other desired duration and may transmit tone signals at other desired frequencies. For example, it may be convenient to modulate the carrier output of transmitter 51 with the 1,024 Hz output of oscillator 41 and to transmit, under control of timing circuit 48, short duration bursts of such modulated signals once every 5 or 10 minutes.

In the embodiment shown in FIG. 4, navigational aid device 37 is designed to receive a radiated energy signal of such short duration from the transmitting means of FIG. 3 and emit flashing light simultaneously with light 38 in the transmitting navigational aid device 36. A receiver means 60 receives the radiated energy signal received from transmitter 51, and the output signal of receiver 60 passes through a narrow pass-band filter 61, which is similar to filter 19 in FIG. 2 and passes only the tone signals modulating the transmitted signal. The output of filter 61 in each device 37 is connected to its respective ripple counter 62 and resets these ripple counters so that a plurality of the devices 37 can be operated in synchronism. Ripple counter 63 reduces the signals generated by oscillator 63 to a frequency of 1 Hz in the same manner as counter 16 of FIG. 2.

As an alternate embodiment of this invention, each of a plurality of navigational aid devices utilizing the principles of this invention may be controlled to emit navigational aid signals in a predetermined time sequence. For this purpose, each of the switch means 13 can be modified as shown in FIG. 6 to include a delay circuit 17 for delaying the response by the respective switch means to synchronizing signal C. Delay circuit 17 can be adjustable and each delay circuit in each navigational aid device 10 can be set so that the lights in a navigational aid system are flashed in a predetermined periodic sequence, the beginning of each sequence being initiated by receipt of the radio beacon tone. Delay circuit 17 is preferably a monostable multivibrator 18 to control its operation.

By way of illustration, a plurality of navigational aid devices 31–34 that include delay circuits 17 may be arranged in rows along the boundaries of a navigational channel 30 as illustrated in FIG. 1 in order to guide a ship 30a. In this instance, channel light devices 31, located on each side of the channel, may be controlled so that their lights flash simultaneously with triggering pulse A. In the next adjacent navigational aid devices 32, a delay circuit 17 may be set so that its light signal is emitted 0.2 seconds later than the light signal from devices 31. In a similar manner, devices 33 and 34 may also be set such that the light emitted by device 33 occurs 0.2 seconds later than the light emitted by devices 32, and the light emitted by devices 34 occurs 0.2 seconds later than that emitted by devices 33. By sequencing these rows of lights, the lights are easily distinguishable from any kind of background lighting and thereby provide vessel 30a with a clear route through the channel. Of course, all of lights 31–34 can be flashed simultaneously by employing the present invention without delay circuit 17.

As can be appreciated from the above description, navigational aid devices employing the principles of this invention can be used to synchronize one or more aids to navigation range lights, channel lights, and other equipment such as beacons, fog sound signals, etc., to a reference time base transmitted by a radiated energy signal for aiding in identification and use of the aids. The devices can be arranged in such a manner in a system that one of these devices can comprise a master or reference unit, and one or more other units may be synchronized to the master unit. An example of this usage is a pair of navigational aid range lanterns synchronized to flash simultaneously. Another example, using a single master unit and several slave units, is a system of channel marker lights all flashing simultaneously, for positive identification of the channel limits. Also, a synchronizing transmitter unit can be carried by the pilot of a ship when he guides the ship through a navigable channel. The lights marking the channel, which are normally operating unsychronized, can be controlled to begin operating in synchronism when the pilot activates his transmitting equipment.

Also, a stable time mark can be obtained from a previously established radio signal such as WWV or various radio beacons established by lighthouse authorities, as described in detail herein.

Further, a system of navigational aids can comprise two such aids or many—the geographical extent of this system being limited by range of radio equipment being used. When the radio-beacon transmissions are used, synchronism of all navigational aid devices in a very large geographic area can be provided. Furthermore, the apparatus described is fail-safe, in that the navigational aid will continue to operate on its own even though the transmission link or other portion of the synchronizing apparatus has failed. Even if spurious signals, such as static from flashes of lightning, get through the filtering and discriminating circuits of the described apparatus, no great harm can be done because the result will usually be that all the navigational aid devices in a system will be reset simultaneously.

Also, the described apparatus does not require periodic resetting as would be required with systems suggested in the prior art.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. A system for generating a plurality of intermittent, navigational aid signals in response to receipt of a distinctive radiated energy signal, generated independently and externally of the system, and being generated at regular relatively short time intervals, said system comprising in combination: a plurality of independently powered and operated wireless navigational aid devices for providing said navigational aid signals, each of said navigational aid devices respectively including emitting means for emitting such a navigational aid signal, switch means connected to the respective emitting means, the switch means of each navigational aid device adapted to intermittently connect its respective emitting means to a source of electrical energy to cause one of said navigational aid signals to be emitted; receiver means for receiving said distinctive radiated energy signal at each of said navigational aid devices independently of the receipt of said signal at any other of said devices; and synchronizing means connected between the respective receiver means and respective switch means and responding to receipt by said receiver means of said distinctive radiated energy signal to independently provide synchronizing signals respectively at each of said navigational aid devices at a substantially fixed point in time with respect to receipt of said distinctive radiated energy signal, each of said switch means responding to its respective synchronizing signal to cause each of said emitting means to provide its respective navigational aid signal so that the operation of each of said navigational aid devices is independently synchronized to have a desired time relationship with the operation of said other navigational aid devices at each of said relatively short time intervals.

2. The system of claim 1 wherein each of said navigational aid signals are emitted sequentially.

3. The apparatus of claim 2 in which each switch means includes delay means connected to the respective synchronizing means and emitting means and responding to the respective synchronizing signal to produce a triggering pulse after a predetermined delay period, the delay period of the delay means of each of said navigational aid devices being such with respect to the delay period of the delay means of the other navigational aid devices that the triggering pulses in each of said navigational devices are generated sequentially with respect to each other.

4. The system of claim 3 in which said navigational aid devices are channel lights disposed in a row to mark a navigation channel and the delay means in each device has a different period of delay so that the channel lights are flashed in sequence along such a row.

5. The system of claim 1 wherein each of said switch means includes resettable clock means adapted to be reset by said synchronizing signal and having substantially the same repetition rate as the other clock means of the system so that when each of said clock means receives and is reset by its respective synchronizing signal all of the emitting means will emit said navigational aid signals substantially simultaneously until said clock means are subsequently reset.

6. A system for generating a plurality of flashing lamp navigational aid signals in substantial synchronism in response to receipt of a distinctive radiated energy signal at regular relatively short time intervals substantially less than the time at which sufficient deviation between the flash on time of any two of the plurality of flashing lamps occurs such that substantial synchronism of all of said lamps is not provided, said system comprising in combination: a plurality of navigational aid devices for providing said navigational aid signals, each of said navigational aid devices respectively including a lamp for emitting such a navigational signal, switch means connected to the respective lamp, the switch means of each navigational aid device each navigational aid device adapted to intermittently connect its respective emitting means to a source of electrical energy to cause one of said navigational aid signals to be emitted; receiver means for receiving said distinctive radiated energy signal at each of said navigational aid devices independently of the receipt of said signal at any other of said devices; and synchronizing means connected between the respective receiver means and respective switch means and responding to receipt by said receiver means of said distinctive radiated energy signal to independently provide synchronizing signals respectively at each of said navigational aid devices at a substantially fixed point in time with respect to receipt of said distinctive radiated energy signal, each of said switch means responding to its respective synchronizing signal to cause each of said emitting means to provide its respective navigational aid signal so that the operation of each of said navigational aid devices is independently synchronized to have a desired time relationship with the operation of said other navigational aid devices at each of said relatively short time intervals.

7. The system of claim 6 further including a navigational aid device in which a transmitting means is provided for emitting said distinctive radiated energy signal.

8. The system of claim 7 in which said transmitting means includes means connected to the respective switch means and responding thereto to cause said transmitting means to emit said distinctively radiated energy signal.

9. The device of claim 6 in which said distinctive radiated energy signal includes pulses of relatively short duration and at least one pulse of relatively long duration in a coded sequence, and wherein said synchronizing means includes means deocding said distinctive radiated signal and providing said synchronizing signal in response to receipt of said long duration pulse.

10. The device of claim 9 wherein said last mentioned means provides a first signal in response to receipt of each pulse of said coded sequence, and provides a second signal in response to said relatively long duration pulse of said distincive radiated energy signal, and further including means generating said synchronizing signal in response to the coicidence of said first and second signals.

11. A navigational aid device for generating intermittent navigational aid signals at selected points in time in response to a distinctive radiated energy signal which transmits a distinctive character at regular, relatively short time intervals, said distinctive radiated energy signal including pulses of relatively short duration and at least one pulse of relatively long duration in a coded sequence, said coded sequence being repeated at regular short time intervals and said relatively long duration pulse providing said distinctive character, said device comprising, in combination: emitting means emitting said navigational aid signals; switch means connected to said emitting means and adapted to intermittently connect said emitting means to a source of electrical energy to cause it to emit said navigational aid signals; receiver means for receiving said distinctive radiated energy signal; and synchronizing means connected between said receiver means and said switch means and responding to receipt by said receiver means of said distinctive character of said distinctive radiated energy signal to provide a synchronizing signal at a substantially fixed point in time with respect to receipt of said distinctive radiated energy signal, said synchronizing means including means decoding said distinctive radiated signal and providing said synchronizing signal in response to receipt of said long duration pulse, said switch means responding to said synchronizing signal to provide said navigational aid signal.

12. The device of claim 11 in which said decoding means includes a capacitor, means for charging said capacitor in response to receipt of said coded pulses, and means resPonding to the charge on said capacitor to provide said seocnd signal when this charge reaches a predetermined level.

13. The device of claim 12 in which said last mentioned means is a zener diode and said predetermined level is the breakdown voltage of said zener diode.

14. The device of claim 13 wherein the RC timing constant of said capacitor and charging means and the breakdown value of said zener are such that this value is not reached on said capacitor until it is charged for a period of time longer than the duration of said relatively short duration pulses.

15. The device of claim 11, in which said switch means includes clock means connected to said synchronizing means and generating a series of triggering pulses, said clock means being reset in response to said synchronizing signals, and means connected to said emitting means and to said clock means and responding to each triggering pulse to connect said emitting means to said source of electrical energy.

16. The device of claim 11 wherein said last mentioned means provides a first signal in response to receipt of each pulse of said coded sequence, and provides a second signal in response to said relatively long duration pulse of said distinctive radiated energy signal, and further including means generating said synchronizing signal in response to the coincidence of said first and second signals.

* * * * *

UNITED STATES PATENT OFFICE
CERTIFICATE OF CORRECTION

Patent No. 3,787,867  Dated January 22, 1974

Inventor(s) Robert J. Dodge, Wilson R. Huffer

It is certified that error appears in the above-identified patent and that said Letters Patent are hereby corrected as shown below:

nergy to cause one of said navigational aid signals to be emitted; esettable clock means connected to said switch means to ntermittently operate same to provide a substantially equal redetermined lamp flash cycle for each lamp; receiver means for eceiving said distinctive radiated energy signal at each of said avigational aid devices, and synchronizing means connected between he respective receiver means and respective clock means and esponding to receipt by said receiver means of said distinctive adiated energy signal to provide synchronizing signals respectively t each of said navigational aid devices at substantially the same oint in time, each of said clock means responding to its respective ynchronizing signal to be reset to start the predetermined lash cycle anew at each of said navigational aid devices at ubstantially the same time.-- ol. 11, line 65 (Claim 9), "deocding" should be --decoding--
ol. 12, line 7 (Claim 10), "coicidence" should be --coincidence--
ol. 12, line 40 (Claim 12), "resPonding" should be --responding--
ol. 12, line 41 (Claim 12), "seocnd" should be --second--

In the Drawings:

Figure 2, "Receiver 18" should be -- Receiver 28 --.

Figure 3, the lead line to 21a and the "+" to the uper input terminal should be added.

Figure 5, the numeral -- 69 -- should be added.

Signed and sealed this 17th day of June 1975.

(SEAL)
Attest:

RUTH C. MASON
Attesting Officer

C. MARSHALL DANN
Commissioner of Patents
and Trademarks